US010046607B2

(12) United States Patent
Abe (10) Patent No.: US 10,046,607 B2
(45) Date of Patent: Aug. 14, 2018

(54) WINTER TIRE

(71) Applicant: SUMITOMO RUBBER INDUSTRIES, LTD., Kobe-shi, Hyogo (JP)

(72) Inventor: Shotaro Abe, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 43 days.

(21) Appl. No.: 15/146,409

(22) Filed: May 4, 2016

(65) Prior Publication Data

US 2016/0347124 A1 Dec. 1, 2016

(30) Foreign Application Priority Data

May 26, 2015 (JP) ................................. 2015-106103

(51) Int. Cl.
*B60C 11/03* (2006.01)
*B60C 11/13* (2006.01)
(Continued)

(52) U.S. Cl.
CPC .......... *B60C 11/0332* (2013.01); *B60C 11/00* (2013.01); *B60C 11/005* (2013.01);
(Continued)

(58) Field of Classification Search
CPC ......... B60C 2011/0374; B60C 11/0302; B60C 2011/0372; B60C 11/1625; B60C 2011/0358
See application file for complete search history.

(56) References Cited

U.S. PATENT DOCUMENTS 4,456,046 A * 6/1984 Miller ................. B60C 11/0302
152/209.18
9,174,494 B2 * 11/2015 Matsumoto ............. B60C 11/04
(Continued)

FOREIGN PATENT DOCUMENTS

EP 2853416 A1 4/2015
JP 2014-151811 A 8/2014
(Continued)

OTHER PUBLICATIONS

WO2015098547 (A1) Machine Translation https://worldwide.espacenet.com/publicationDetails/description?CC=EP&NR=3081400A1&KC=A1&FT=D&ND=&date=20161019&DB=&locale=enEP# As Viewed on Aug. 25, 2017.*
(Continued)

*Primary Examiner* — Jodi C Franklin
(74) *Attorney, Agent, or Firm* — Birch, Stewart, Kolasch & Birch, LLP (57) ABSTRACT

A winter tire includes a tread portion provided with first inclined main grooves extending from a first tread edge near a tire equator, second inclined main grooves extending from a second tread edge near the tire equator, a first inner longitudinal groove connecting a pair of first inclined main grooves at the vicinity of the tire equator and a second inner longitudinal groove connecting a pair of second inclined main grooves at the vicinity of the tire equator. Each of the first inclined main grooves includes an axially first inner end portion extending along an axial direction of the tire to the second inner longitudinal groove, and each of the second inclined main grooves includes an axially second inner end portion extending along the axial direction of the tire to the first inner longitudinal groove.

9 Claims, 7 Drawing Sheets

(51) Int. Cl.
  *B60C 11/16* (2006.01)
  *B60C 11/00* (2006.01)
  *B60C 11/12* (2006.01)
(52) U.S. Cl.
  CPC ...... *B60C 11/0008* (2013.01); *B60C 11/0302* (2013.01); *B60C 11/0306* (2013.01); *B60C 11/12* (2013.01); *B60C 11/1307* (2013.01); *B60C 11/16* (2013.01); *B60C 11/1625* (2013.01); *B60C 2011/0016* (2013.01); *B60C 2011/0033* (2013.01); *B60C 2011/0334* (2013.01); *B60C 2011/0358* (2013.01)

(56) References Cited

U.S. PATENT DOCUMENTS

| | | | | |
|---|---|---|---|---|
| 2002/0053381 A1* | 5/2002 | Hartwig | ............ | B60C 11/0302 152/209.8 |
| 2012/0312438 A1* | 12/2012 | Shinzawa | ........... | B60C 11/0302 152/209.8 |
| 2013/0192732 A1* | 8/2013 | Itoi | .......... | B60C 11/11 152/209.8 |
| 2013/0206297 A1* | 8/2013 | Bestgen | .............. | B60C 11/0306 152/209.18 |
| 2014/0261937 A1* | 9/2014 | Fujita | ...................... | B60C 11/11 152/209.18 |
| 2015/0266345 A1* | 9/2015 | Takei | .................. | B60C 11/0306 152/209.8 |
| 2015/0298506 A1* | 10/2015 | Katayama | ........... | B60C 11/1369 152/209.25 |
| 2015/0343847 A1* | 12/2015 | Niwa | .................. | B60C 11/0306 152/209.5 |
| 2015/0375572 A1* | 12/2015 | Endo | .................. | B60C 11/0302 152/209.25 |
| 2016/0243899 A1* | 8/2016 | Miyoshi | .............. | B60C 11/0302 |

FOREIGN PATENT DOCUMENTS

| | | | |
|---|---|---|---|
| WO | WO 2010098092 A1 * | 9/2010 | |
| WO | WO 2014/118659 A1 | 8/2014 | |
| WO | WO 2014118659 A1 * | 8/2014 | |
| WO | WO 2015098547 A1 * | 7/2015 | |

OTHER PUBLICATIONS

Extended European Search Report, dated Oct. 7, 2016, for European Application No. 16168669.6.

* cited by examiner

PRIOR ART

WINTER TIRE

BACKGROUND ART

Field of the Invention

The present invention relates to winter tires, and in particular to a winter tire capable of improving driving performance on snow and ice.

Description of the Related Art

Japanese Unexamined Patent Application Publication No. 2014-151811 discloses a winter tire that includes a tread portion provided with a plurality of inclined main grooves each extending axially inwardly from each tread edge to the vicinity of the tire equator. These inclined main grooves may disperse water, snow or slush under the tread portion outside of the tire. On the other hand, the axially inner end portions of the inclined main grooves extend substantially along the circumferential direction of the tire in the vicinity of the tire equator. Unfortunately, such a winter tire as disclosed in the above document would have less traction available on snow and ice. Furthermore, since the inner end portions of the inclined main grooves of the winter tire terminate without communicating with any other grooves, the inclined main grooves would be clogged up with compressed snow during traveling.

SUMMARY OF THE INVENTION

In view of the above problems in the conventional art, the present invention has an object to provide a winter tire capable of improving driving performance on snow and ice.

According to one aspect of the invention, a winter tire includes a tread portion being provided with a plurality of first inclined main grooves extending from a first tread edge to or near a tire equator, a plurality of second inclined main grooves extending from a second tread edge to or near the tire equator, a first inner longitudinal groove connecting a pair of adjacent first inclined main grooves at the vicinity of the tire equator and a second inner longitudinal groove connecting a pair of adjacent second inclined main grooves at the vicinity of the tire equator. The first inclined main grooves and the second inclined main grooves are arranged alternately in a circumferential direction of the tire. Each of the first inclined main grooves includes an axially first inner end portion extending along an axial direction of the tire to the second inner longitudinal grooves, and each of the second inclined main grooves includes an axially second inner end portion extending along the axial direction of the tire to the first inner longitudinal grooves.

In another aspect of the invention, the first inner longitudinal groove may be located between the first tread edge and the tire equator, the first inner longitudinal groove may include a bending portion protruding toward the tire equator, and one of the second inner end portions may be connected to the bending portion of the first inner longitudinal groove.

In another aspect of the invention, the second inner longitudinal groove may be located between the second tread edge and the tire equator, the second inner longitudinal groove may include a bending portion protruding toward the tire equator, and one of the first inner end portions may be connected to the bending portion of the second inner longitudinal groove.

In another aspect of the invention, the first inner end portions may be arranged on a different location with respect to the second inner end portions in the axial direction of the tire.

In another aspect of the invention, the tread portion may further be provided with a first inner lateral groove that extends axially outward from the first inner longitudinal groove with an opposite inclination direction to the first inclined main grooves.

In another aspect of the invention, the tread portion may further be provided with a second inner lateral groove that extends axially outwardly from the second inner longitudinal groove with an opposite inclination direction to the second inclined main grooves.

DESCRIPTION OF THE PREFERRED EMBODIMENTS

An embodiment of the present invention will be explained below with reference to the accompanying drawings.

Figure 1:
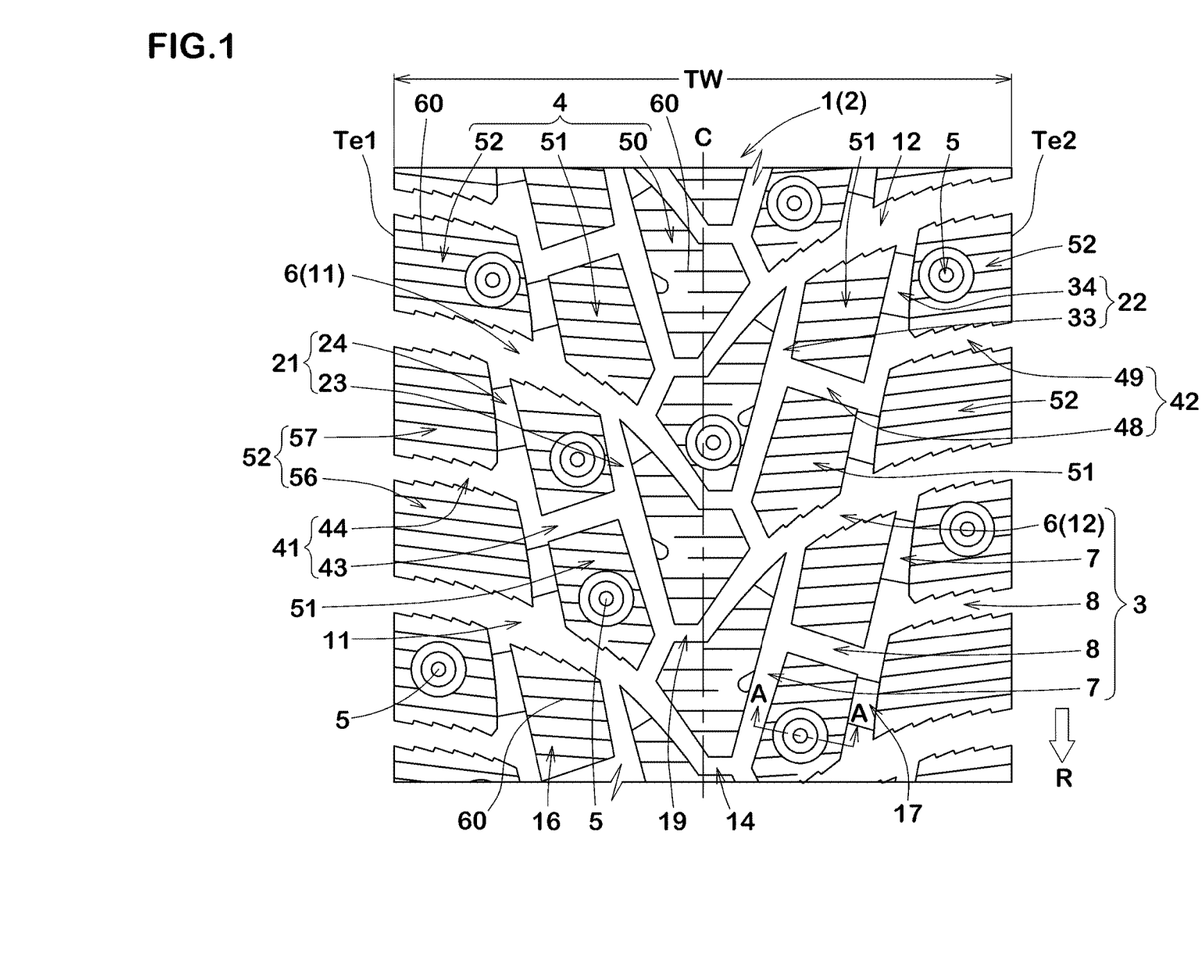
FIG. 1 is a development view of a tread portion of a winter tire according to an embodiment of the present invention.

FIG. 1 illustrates a development view of a tread portion 2 of a winter tire 1 according to an embodiment of the present invention. In a preferred embodiment, the winter tire 1 illustrated in FIG. 1 is embodied as a tire for passenger cars.

As illustrated in FIG. 1, the tread portion 2 of the tire in accordance with the present embodiment includes a tread pattern having a designated rotational direction R, for example. The rotational direction R may be indicated on a sidewall portion (not illustrated) of the tire using characters or a sign, for example.

The tread portion 2 is provided with a plurality of grooves 3 and a plurality of blocks 4. In this embodiment, at least one of the blocks 4 is provided with a stud pin or a hole 5 for installing the stud pin (hereinafter, these elements may be referred to as "hole 5" collectively.). Note that the present invention is not limited to the above aspect, but can be employed as a studless tire suitably.

The grooves 3 includes a plurality of inclined main grooves 6 spaced in the circumferential direction of the tire, a plurality of longitudinal grooves 7 and a plurality of lateral grooves 8.

The inclined main grooves 6 include a plurality of first inclined main grooves 11 and a plurality of second inclined main grooves 12.

Each of the first inclined main grooves 11 extends from a first tread edge Te1 (the left side in FIG. 1) to or near the tire equator C. Each of the second inclined main grooves 12 extends from a second tread edge Te2 (the right side in FIG. 1) to or near the tire equator C.

As used herein, the tread edges Te1 and Te2 mean to the axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Unless otherwise noted, dimensions of respective portions of the tire are values specified in a normally inflated unloaded condition such that the tire 1 is mounted on the standard wheel urn with the standard pressure, but is loaded with no tire load.

The first inclined main grooves 11 and the second inclined main grooves 12 are arranged alternately in the circumferential direction of the tire. More specifically, the first inclined main grooves 11 and the second inclined main grooves 12 appear on the tire equator C alternately in the circumferential direction of the tire.

Figure 2:
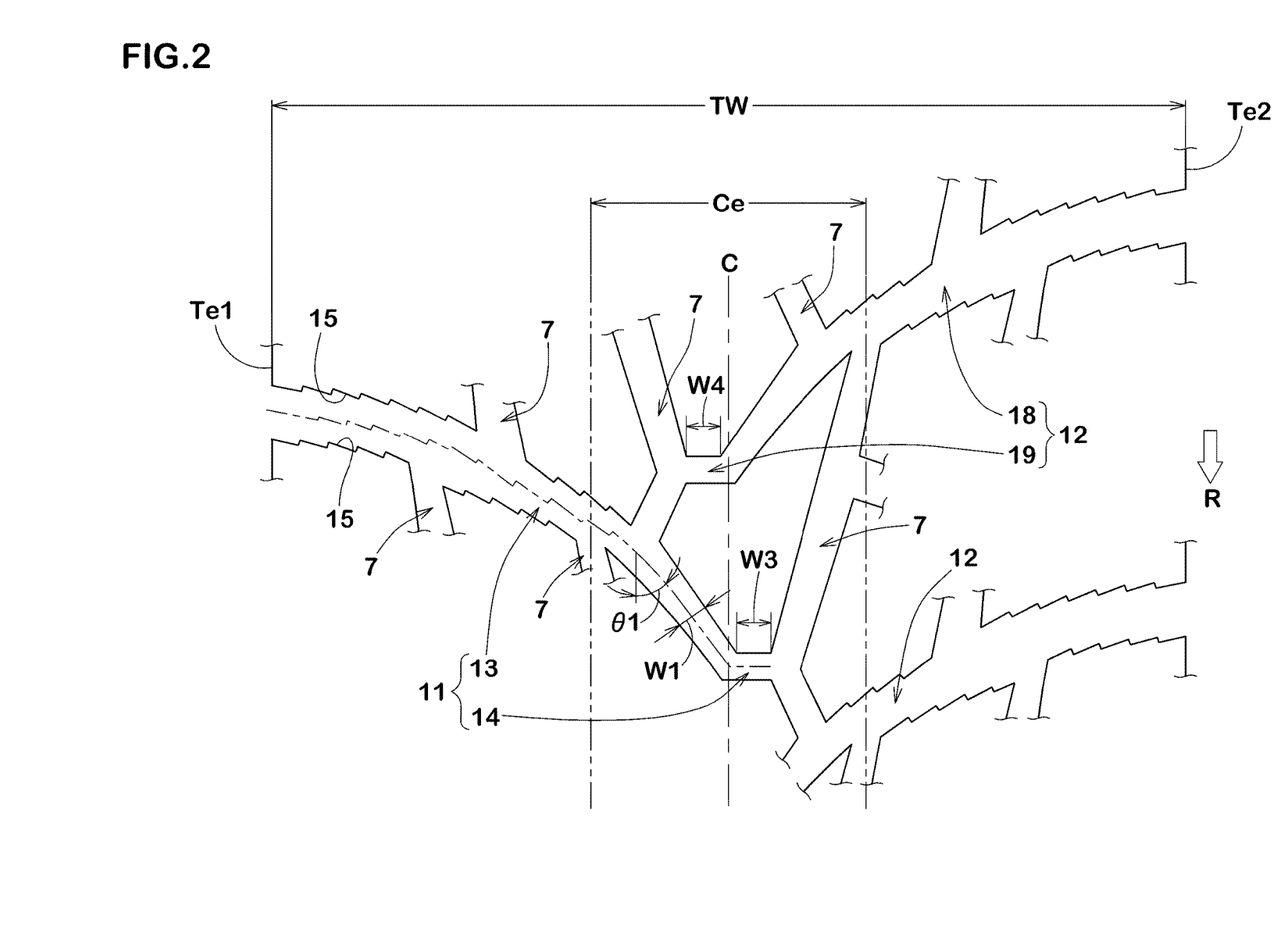
FIG. 2 is an enlarged view of contours of a first inclined main groove and a second inclined main groove.

FIG. 2 illustrates an enlarged view of contours of one of the first inclined main grooves 11 and one of the second inclined main grooves 12. As illustrated in FIG. 2, the first inclined main groove 11 has an inclination so as to extend from the first tread edge Te1 toward the rotational direction R, for example. The second inclined main groove 12 has an inclination so as to extend from the second tread edge Te2 toward the rotational direction R, for example.

Each of the first inclined main grooves 11 includes a first main portion 13 extending between the first tread edge Te1 and the tire equator C with the inclination and a first inner end portion 14 connected to the first main portion 13 on the side of the tire equator C.

Each of the first main portions 13 has an angle θ1 of from 30 to 80 degrees with respect to the circumferential direction of the tire, for example. Preferably, the first main portion 13 may curve in an arc manner so that the angle θ1 increases toward the first tread edge Te1.

Preferably, each of the first main portions 13 has a width W1 in a range of from 3.0% to 7.0% of a tread width TW to offer large snow-shearing force. More preferably, the width W1 of at least one of the first main portions 13 may increase toward the first tread edge Te1. The tread width TW is defined as an axial distance between the first tread edge Te1 and the second tread edge Te2 under the normally inflated unloaded condition.

The first main portion 13, for example, includes a zigzag groove edge 15 at least partially to improve on-ice performance. Furthermore, a plurality of longitudinal grooves 7 is communicated with each first main portion 13. The details of the longitudinal grooves 7 will be described later.

Each of the first inner end portion 14 extends along the axial direction of the tire and is communicated with one of the longitudinal grooves 7 that connects a pair of circumferentially adjacent second inclined main grooves 12 and 12.

The first inner end portions 14 of the first inclined main grooves 11 can compress snow strongly to form a laterally-long hard snow column therein around the tire equator C on which a large ground contact pressure acts when coming into contact with snowy road. Thus, the tire would increase traction on snow so that an excellent on-snow performance can be obtained. Furthermore, each of the first inner end portions 14 communicating with one of the longitudinal grooves 7 can prevent that the main inclined grooves are clogged up with snow. Furthermore, the groove edges 15 of the first inner end portions 14 can scratch icy road with a large ground contact pressure to generate a large friction force so that an excellent on-ice performance of the tire can be obtained.

In order to further improve the effects described above, the first inner end portions 14 are preferably located in a crown region Ce centered on the tire equator C with a width of 30% of the tread width TW, for example.

For example, the first inner end portions 14 are communicated with the first main portions 13 within the crown region Ce.

Preferably, the first inner end portions 14 and the first main portions 13 are connected on the tire equator C, as illustrated in FIG. 1. Alternatively, the first inner end portion 14 and the first main portion 13 may be connected on either side with respect to the tire equator C (e.g., on the side of the first tread edge Te1 or on the side of the second tread edge Te2).

Each of the second inclined main grooves 12 includes a second main portion 18 extending between the second tread edge Te2 and the tire equator C with an inclination and a second inner end portion 19 connected to the second main portion 18 on the side of the tire equator C.

The second inclined main grooves 12 have substantially line symmetrical contours to those of the first inclined main grooves 11 with respect to the tire equator C. That is, the second main portions 18 and the second inner end portions 19 have substantially the same configuration as the first main portions 13 and the first inner end portions 14, respectively.

Each of the second inner end portions 19 extends along the axial direction of the tire and is communicated with one of the longitudinal grooves 7 that connects a pair of circumferentially adjacent first inclined main grooves 11 and 11. These second inclined main grooves 12 may improve driving performance on snow and ice effectively, as the first inclined main grooves 11.

Preferably, the first inner end portions 14 are arranged on a different location with respect to the second inner end portions 19 in the axial direction of the tire. In this embodiment, the first inner end portions 14 are arranged on the side of the second tread edge Te2 with respect to the tire equator C, and the second inner end portions 19 are arranged on the side of first tread edge Te1 with respect to the tire equator C. Such a configuration of the first inner end portions 14 and the second inner end portions 19 can increase traction on snow in a wider area of the crown region Ce.

Axial widths W3 of the first inner end portions 14 and axial widths W4 of the second inner end portions 19 are preferably in a range of not less than 3%, more preferably not less than 5%, but preferably not more than 8%, more preferably not more than 6% of the tread width TW, in order to further improve the effects described above.

Preferably, depths of the first inner end portions 14 and the second inner end portions 19 are in a range of not less than 3.0 mm, more preferably not less than 4.5 mm, but preferably not more than 8.0 mm, more preferably not more than 6.5 mm, in order to further improve on-snow performance of the tire.

As illustrated in FIG. 1, the longitudinal grooves 7 include a plurality of first longitudinal grooves 21 and a plurality of second longitudinal grooves 22, for example. Each of the first longitudinal grooves 21, for example, is disposed in a first region 16 between the tire equator C and the first tread edge Te1 so as to connect a pair of circumferentially adjacent first inclined main grooves 11 and 11. Each of the second longitudinal grooves 22, for example, is disposed in a second region 17 between the tire equator C and the second tread edge Te2 so as to connect a pair of circumferentially adjacent second inclined main grooves 12 and 12.

Figure 3:
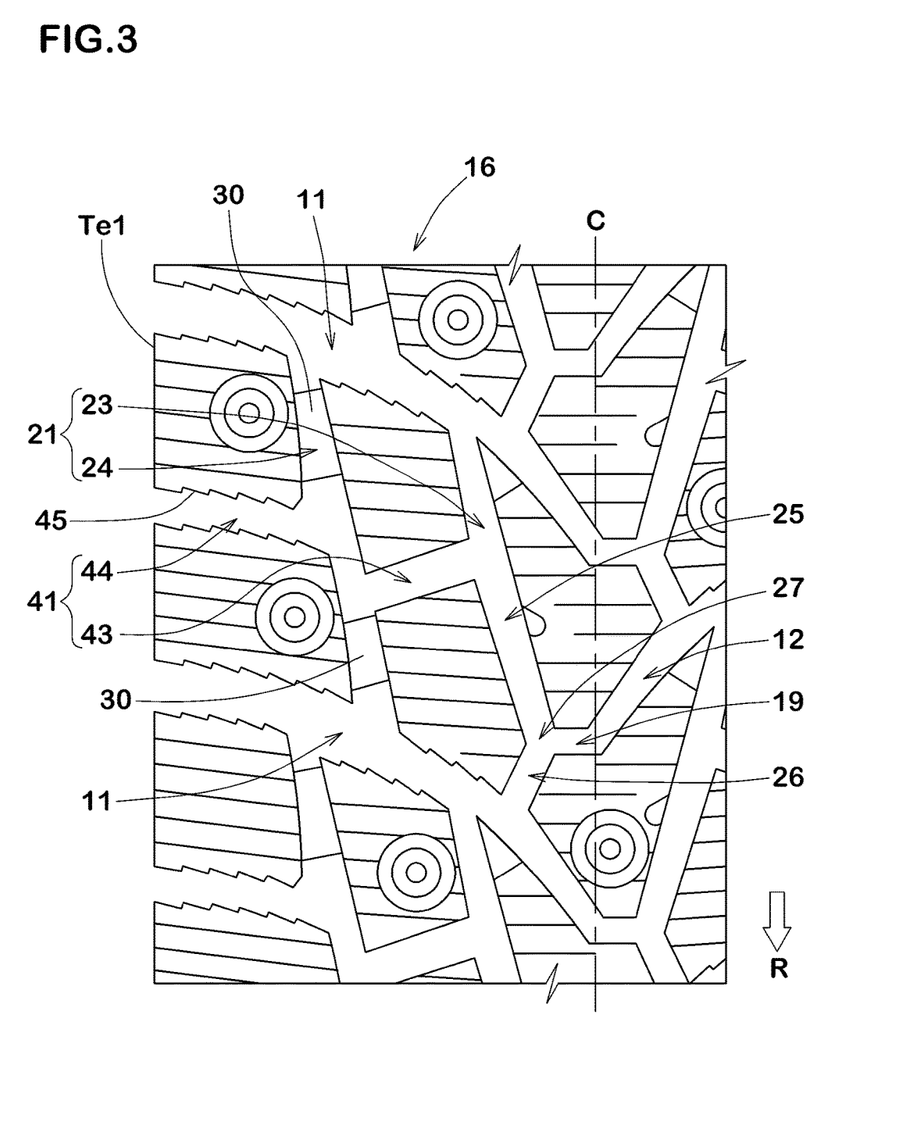
FIG. 3 is an enlarged view of a first region of the tread portion of FIG. 1.

FIG. 3 illustrates an enlarged view of the first region 16 of the tread portion 2. As illustrated in FIG. 3, the first longitudinal grooves 21 includes a plurality of first inner longitudinal grooves 23 disposed on the side of the tire equator C and a plurality of first outer longitudinal grooves 24 disposed on the side of the first tread edge Te1.

In this embodiment, each of the first inner longitudinal grooves 23 includes a first main element 25 and a first sub element 26, and which are inclined in an opposite direction from each other. Thus, each of the first inner longitudinal grooves 23 is bent so as to include a corner portion 27 protruding toward the tire equator C, for example.

The first main elements 25, for example, extend from the corner portions 27 with an opposite inclination direction to the second inclined main grooves 12. The first sub elements 26, for example, extend from the corner portions 27 with the same inclination direction as the second inclined main grooves 12 toward the rotational direction R. Such a configuration of the first main elements 25 and the first sub elements 26 would offer groove edge components having various directions to improve on-ice performance.

Each of the first inner longitudinal grooves 23 is communicated with one of the second inner end portions 19 of the second inclined main grooves 12. Preferably, the second inner end portion 19 of the second inclined main groove 12 communicates at the corner portion 27 of the first inner longitudinal groove 23. When traveling on snow, the first inner longitudinal groove 23 can further be bent according to elastic deformation of the tread portion 2 in contact with the ground so as to push out the snow introduced therein toward the second inner end portion 19. Thus, snow introduced in the second inner end portion 19 would be taken away therefrom during traveling, i.e., self-cleaning feature of grooves can be offered.

The first outer longitudinal groove 24 is deposed axially outward of the first inner longitudinal groove 23, and is inclined in the some direction as the first main element 25 of the first inner longitudinal groove 23, for example. Preferably, the first outer longitudinal groove 24 is provided with at least one tie-bar 30 in which a groove bottom rises. This may prevent the first outer longitudinal groove 24 from deforming so that groove edges thereof can surely be in contact with the ground to improve on-ice performance.

As illustrated in FIG. 1, the at least one second longitudinal groove 22 includes a second inner longitudinal groove 33 disposed on the side of the tire equator C and a second outer longitudinal groove 34 disposed on the side of the second tread edge Te2.

Figure 4:
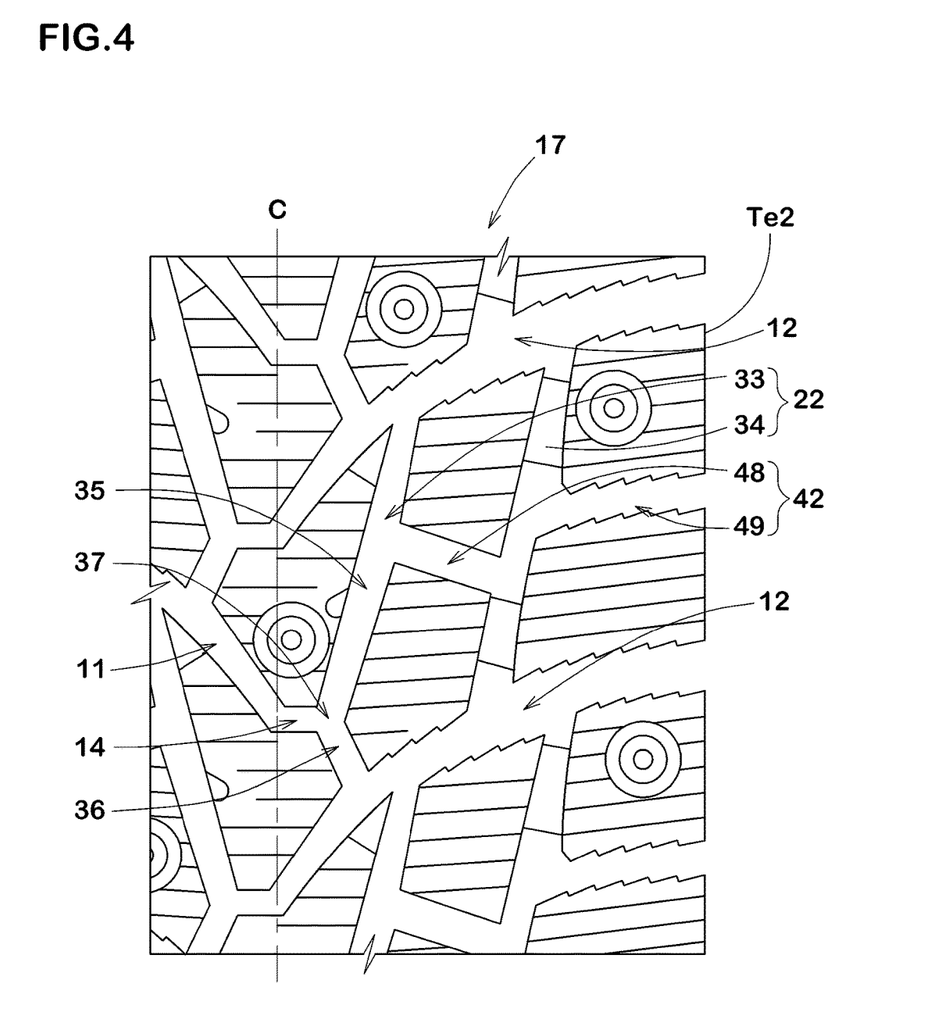
FIG. 4 is an enlarged view of a second region of the tread portion of FIG. 1.

FIG. 4 illustrates an enlarged view of the second region 17 of the tread portion 2 of FIG. 1. As illustrated in FIG. 4, the second inner longitudinal groove 33 and the second outer longitudinal groove 34 have substantially line symmetrical contours to those of the first inner longitudinal groove 23 and the first outer longitudinal groove 24 (illustrated in FIG. 3) respectively with respect to the tire equator C. Furthermore, the second outer longitudinal groove 33, for example, includes a second main element 35 and a second sub element 36, and which are inclined in an opposite direction from each other. Thus, the second inner longitudinal groove 33 is bent so as to include a corner portion 37 protruding toward the tire equator C, for example.

The second inner longitudinal move 33 is communicated with one of the first inner end portions 14 of the second inclined main grooves 11. Preferably, the first inner end portion 14 of the first inclined main groove 11 communicates at the corner portion 37 of the second inner longitudinal groove 33. This would give the self-cleaning feature to the first inner end portion 14 as described above.

As illustrated in FIG. 1, the lateral grooves 8 include a plurality of first lateral grooves 41 disposed on the first region 16 and a plurality of second lateral grooves 42 disposed on the second region 17.

As illustrated in FIG. 3, the first lateral grooves 41, for example, include a first inner lateral groove 43 and a first outer lateral groove 44.

The first inner lateral groove 43, for example, communicates the first inner longitudinal groove 23 with the first outer longitudinal groove 24. The first inner lateral groove 43, for example, is inclined in an opposite direction to the first inclined main grooves 11. The first inner lateral groove 43 would form a hard compressed snow therein at a junction of the first outer longitudinal groove 24 to improve on-snow performance.

The first outer lateral groove 44, for example, extends from the first outer longitudinal groove 24 to the first tread edge Te1. In this embodiment, the first outer lateral groove 44 extends in substantially parallel with the first inclined main grooves 11. Preferably, the first outer lateral groove 44 may include a zigzag groove edge at least partially to increase traction on ice by scratching the ground.

As illustrated in FIG. 4, the second lateral grooves 42, for example, include a second inner lateral groove 48 and a second outer lateral groove 49. The second inner lateral groove 48 and the second outer lateral groove 49 have substantially line symmetrical contours to the first inner lateral groove 43 and the first outer lateral groove 44 (illustrated in FIG. 3) respectively with respect to the tire equator C.

The second inner lateral groove 48, for example, communicates the second inner longitudinal groove 33 with the second outer longitudinal groove 34. In this embodiment, the second inner longitudinal groove 48 is inclined in an opposite direction to the second inclined main grooves 12.

The second outer lateral groove 49, for example, extends from the second outer longitudinal groove 34 to the second tread edge Te2. In this embodiment, the second outer lateral groove 49 extends in substantially parallel with the second inclined main grooves 12.

As illustrated in FIG. 1, by providing the grooves 3 described above, the tread portion 2 is separated into central blocks 50, middle blocks 51 and shoulder blocks 52.

Each of the central blocks 50, for example, is surrounded by one of the first inclined main grooves 11, one of the second inclined main grooves 12, the first inner longitudinal groove 23 and the second inner longitudinal groove 33.

Figure 5:
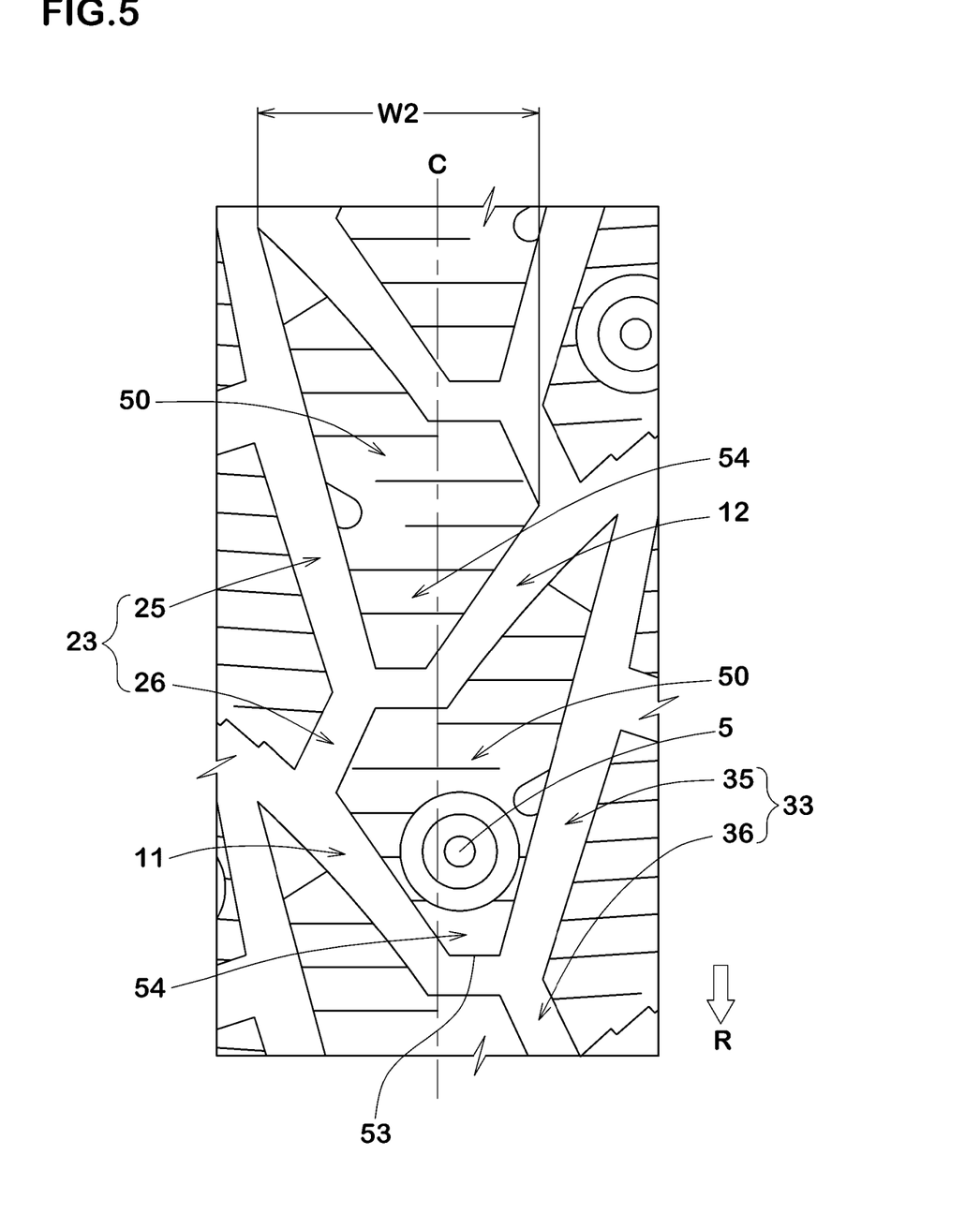
FIG. 5 is an enlarged view of a central block of FIG. 1.

FIG. 5 illustrates an enlarged view of central blocks 50. As illustrated in FIG. 5, each central block 50 includes a tapered portion 54, for example. The tapered portion 54 is a leading portion of each central block 50 where an axial width decreases toward the rotational direction R. In an aspect, the tapered portion 54 may be formed between the first main element 25 of the first inner longitudinal groove 23 and the second inclined main groove 12. In another aspect, the tapered portion 54 may be formed between the second main element 35 of the second inner longitudinal groove 33 and the first inclined main groove 11.

Preferably, the hole 5 for installing a stud pin may be provided on the tapered portion 54 of one of the central blocks 50. When the stud pin is firmly installed in the tapered portion 54, apparent rigidity of the tapered portion 54 can be increased, and therefore the tapered portion 54 would bite snow or ice road effectively so as to improve on-snow and on-ice performance. In particular, since the tapered portion 54 of the central block 50 includes an axially extending block edge 53, the stud pin projected from the tapered portion 54 would be in contact with the ground in a proper state without leaning on the left and right sides.

Preferably, the total number Nc of holes 5 for installing a stud pin on the central blocks 50 is in a range of not less than 10%, more preferably not less than 13%, but preferably not more than 20%, more preferably not more than 17% of the total number Nt of the holes 5 for a stud pin provided on the entire tread portion 2 in order to further improve on-ice performance of the tire while ensuring sufficient central block rigidity.

Preferably, the maximum axial widths W2 of the central blocks 50 are in a range of from 0.1 to 0.3 times of the tread width TW in order to improve both on-ice performance and on-snow performance of the tire in good balance.

As illustrated in FIG. 1, the middle blocks 51, for example, are defined between the first inner longitudinal grooves 23 and the first outer longitudinal grooves 24 on the first region 16 and are defined between, and are defined the second inner longitudinal grooves 33 and the second outer longitudinal grooves 34 on the second region 17.

In case that the holes 16 for installing a stud pin are provided on both circumferentially adjacent middle blocks 51 and 51, the center of the holes 5 may preferably be arranged in different location in the axial direction of the tire from each other. This would be helpful to increase traction on ice.

Preferably, the total number Nm of holes 5 for installing a stud pin provided on the middle blocks 51 on both the first region 16 and the second region 17 is greater than the above mentioned total number Nc. This would further be helpful to increase traction on ice. The total number Nm is preferably in a range of not less than 20%, more preferably not less than 25%, but preferably not more than 40%, more preferably not more than 35% of the total number Nt in order to further improve on-ice performance of the tire.

The shoulder blocks 52, for example, are defined axially outward of the first outer longitudinal grooves 24 on the first region 16, and are defined axially outward of the second outer longitudinal grooves 34. The shoulder blocks 52 include a leading shoulder block 56 and a trailing shoulder block 57 in each region between adjacent inclined main grooves.

Preferably, the trailing shoulder block 57, for example, has an axial width smatter than that of the leading shoulder block 56. This block structure would improve wandering performance of the tire on ice. In a preferred embodiment, one shoulder block 52 having at least one hole 5 for installing a stud pin may be disposed next to one of the middle blocks 51 that is not provided any holes 5. This structure would increase contact pressure of the respective stud pins to icy road by dispersing the pins suitably, thereby improving on-ice performance of the tire.

Preferably, the total number Ns of holes 5 for installing a stud pin provided on the shoulder blocks 52 on both the first region 16 and the second region 17 is greater than the above mentioned total number Nc, more preferably greater than the total number Nm.

Preferably, the total number Ns is in a range of not less than 40%, more preferably not less than 45%, but preferably not more than 60%, more preferably not more than 55% of the total number Nt.

Preferably, each block 4 is provided with at least one, preferably two or more sipes 60 in order to further improve on-ice performance of the tire. As used herein, a sipe is defined as a narrow cut having a width of from 0.5 to 1.5 mm.

Figure 6:
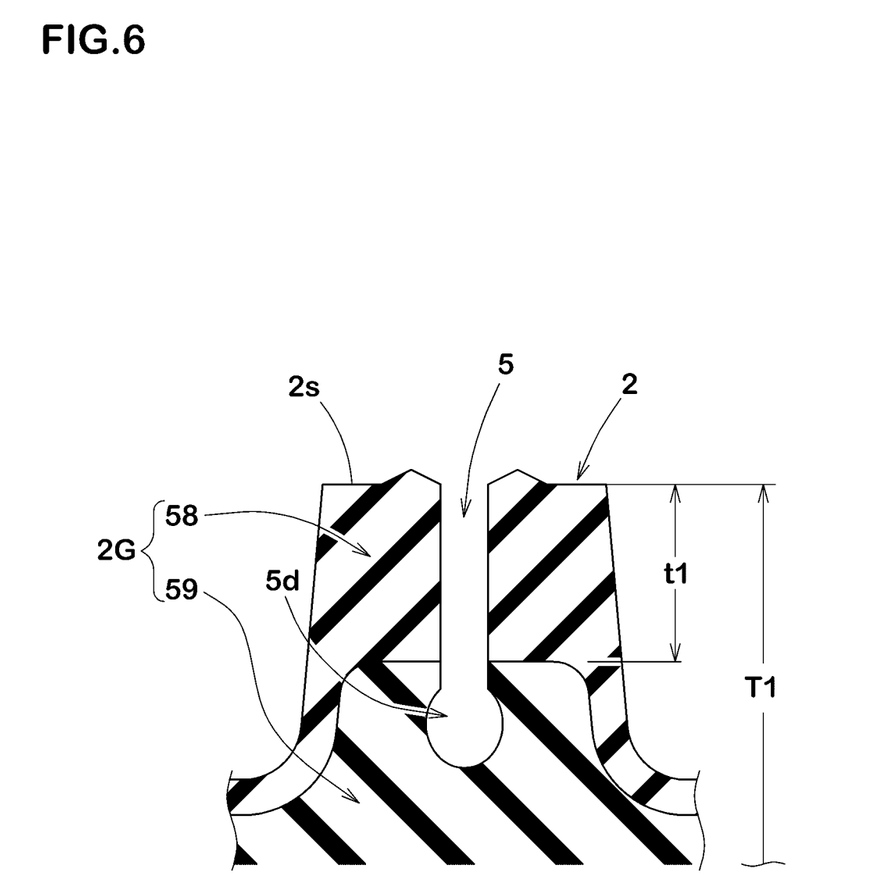
FIG. 6 is a cross-sectional view taken along a line A-A of FIG. 1.

FIG. 6 illustrates a cross-sectional view of one of the middle block taken along a line A-A of FIG. 1 for explaining a tread rubber 2G of the tread portion 2. As illustrated in FIG. 6, the tread rubber 2G, for example, includes a cap rubber layer 58 to form a around contact surface 2s of the tread portion 2 and a base rubber layer 59 disposed radially inward of the cap rubber layer 58. In this embodiment, the base rubber layer 59, for example, is made of rubber composition having a JIS-A hardness greater than that of the cap rubber layer 58. This structure of the tread rubber 2G would improve block edge effect as well as steering stability of the tire by ensuring tread rigidity of the tire. As used herein, the "JIS-A hardness" of rubber means a hardness measured at 23 deg. C. with a type-A durometer according to Japanese Industrial Standard JIS-K6253. Alternatively, in an embodiment, the base rubber layer 59, for example, may be made of lubber composition having a JIS-A hardness smaller than that of the cap rubber layer 58.

The JIS-A hardness Hc of the cap rubber layer 58 is preferably in a range of not less than 46 degrees, more preferably not less than 50 degrees, but preferably not more than 58 degrees, more preferably not more than 54 degrees. Such a cap rubber layer 58 would suppress uneven wear of the tread portion 2 while improving edge effects of blocks 4.

The thickness t1 of the cap rubber layer 58 is preferably in a range of not less than 0.3 times, more preferably not less than 0.45 times, but preferably not more than 0.7 times, more preferably not more than 0.55 times of a total thickness T1 of the tread portion 2. As used herein, the total thickness T1 of the tread portion 2 means a thickness from an outer surface of the radially outermost ply (e.g., a carcass ply, or a belt ply) disposed in the tread portion 2 to the around contact surface 2s of the tread portion 2.

The JIS-A hardness Hb of the base rubber layer 59 is preferably in a range of not less than 58 degrees, more preferably not less than 62 degrees, but preferably not more than 68 degrees, more preferably not more than 64 degrees. Such a base rubber layer 59 would increase rigidity of the tread portion 2 while preventing a separation from the cap rubber layer 58.

Preferably, a bottom portion 5d of the hole 5 is located in the base rubber layer 59. This configuration would firmly support the stud pin since the stud pin is held by the base rubber layer 59 made of a hard rubber composition.

While the particularly preferable embodiments in accordance with the present invention have been described in detail, the present invention is not limited to the illustrated embodiments, but can be modified and carried out in various aspects.

EXAMPLE

Figure 7:
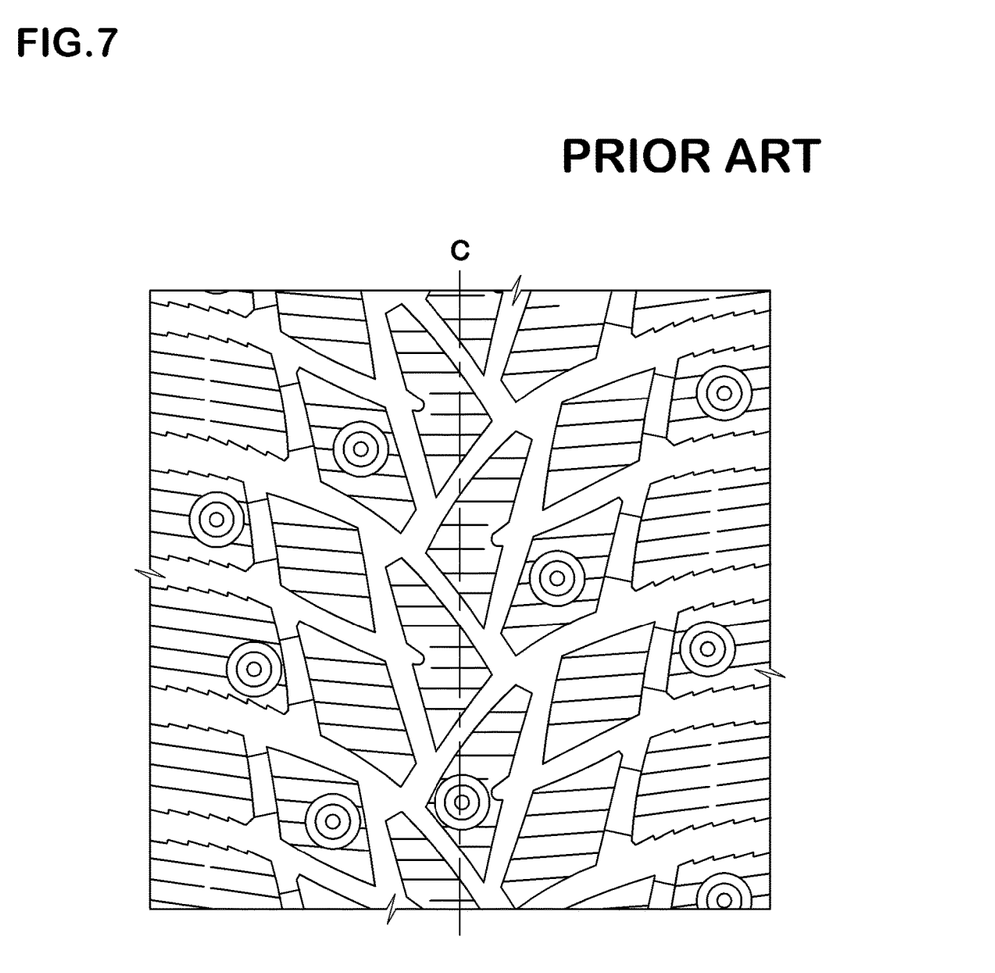
FIG. 7 is a development view of a tread portion of a winter tire according to a comparative example.

Winter tires for passenger cars 205/60R16 having a basic tread pattern illustrated in FIG. 1 were manufactured based on the detail shown in Table 1. As for a comparative example (Ref. 1), a winter tire having a basic tread pattern as illustrated in FIG. 7 was also manufactured. Then, on-snow performance, on-ice performance and holding performance of stud pin of each test tire were tested. The common specification and the test method are as follows.

Rim: 16×6.5
Tire inner pressure: Front 240 kPa, Rear 220 kPa
Test vehicle: Front wheel drive car with displacement of 2,000 cc
Tire installing location: All the wheels On-Snow Performance Test:

The required time for the test vehicle to travel 10 meters on a compressed snow road was measured when the test vehicle was subjected to a sudden start using the first gear of the transmission with a 10% accelerator opening degree. The results are indicated in Table 1 using an index based on the result of Ref. 1 being 100. The smaller the value, the better the performance is.

On-Ice Performance Test:

The required time for the test vehicle to travel 10 meters on an icy road was measured when the test vehicle was subjected to a sudden start in the same manner as the above test. The results are indicated in Table 1 using an index based on the result of Ref. 1 being 100. The smaller the value, the better the performance is.

Holding Performance of Stud Pin Test:

After the test vehicle traveled a certain distance, the number of stud pins that was dropped out from the central blocks was counted. The results are indicated in Table 1 using an index based on the result of Ref. 1 being 100. The smaller the value, the better the performance is.

Table 1 shows the test results that the example winter tires offered an excellent on-snow performance as well as on-ice performance. Furthermore, it is also confirmed that the example winter tires also offered an excellent holding performance of stud pin.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Tread pattern | FIG. 7 | FIG. 1 | FIG. 1 | FIG. 1 | FIG. 1 | FIG. 1 | FIG. 1 | FIG. 1 |
| Ratio W3/TW or W4/TW (%) | — | 5.0 | 3.0 | 6.0 | 8.0 | 10.0 | 5.0 | 5.0 |
| Depths of first and second inner end portions (mm) | — | 5.5 | 5.5 | 5.5 | 5.5 | 5.5 | 3.0 | 4.5 |
| Ratio W2/TW | 0.20 | 0.20 | 0.20 | 0.20 | 0.20 | 0.20 | 0.20 | 0.20 |
| Ratio t1/T1 | 0.45 | 0.45 | 0.45 | 0.45 | 0.45 | 0.45 | 0.45 | 0.45 |
| On-snow performance (Index) | 100 | 85 | 88 | 85 | 87 | 90 | 92 | 88 |
| On-ice performance (Index) | 100 | 88 | 91 | 89 | 87 | 87 | 88 | 88 |
| Holding performance of stud pin(Index) | 100 | 87 | 93 | 87 | 87 | 87 | 86 | 86 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 |
| Ratio W3/TW or W4/TW (%) | 5.0 | 5.0 | 5.0 | 5.0 | 5.0 | 5.0 | 5.0 | 5.0 |
| Depths of first and second inner end portions (mm) | 6.5 | 8.0 | 5.5 | 5.5 | 5.5 | 5.5 | 5.5 | 5.5 |
| Ratio W2/TW | 0.20 | 0.20 | 0.10 | 0.15 | 0.25 | 0.30 | 0.20 | 0.20 |
| Ratio t1/T1 | 0.45 | 0.45 | 0.45 | 0.45 | 0.45 | 0.45 | 0.30 | 0.60 |
| On-snow performance (Index) | 85 | 84 | 90 | 88 | 85 | 86 | 90 | 85 |
| On-ice performance (Index) | 88 | 89 | 91 | 89 | 88 | 87 | 88 | 88 |
| Holding performance of stud pin(Index) | 87 | 93 | 94 | 90 | 87 | 87 | 87 | 91 |

What is claimed is:

1. A winter tire comprising:
a tread portion being provided with a plurality of first inclined main grooves extending from a first tread edge to a tire equator, a plurality of second inclined main grooves extending from a second tread edge to the tire equator, a first inner longitudinal groove connecting a pair of adjacent first inclined main grooves at the vicinity of the tire equator and a second inner longitudinal groove connecting a pair of adjacent second inclined main grooves at the vicinity of the tire equator;
the first inclined main grooves and the second inclined main grooves being arranged alternately in a circumferential direction of the tire;
each of the first inclined main grooves comprising an axially first inner end portion extending in parallel with an axial direction of the tire and communicating with the second inner longitudinal groove; and
each of the second inclined main grooves comprising an axially second inner end portion extending along the axial direction of the tire and communicating with a first inner longitudinal groove, wherein
the first inner end portion is spaced apart from the second inner end portion in the circumferential direction of the tire.

2. The winter tire according to claim 1, wherein the first inner longitudinal groove is located between the first tread edge and the tire equator, the first inner longitudinal groove comprises a bending portion protruding toward the tire equator, and one of the second inner end portions is connected to the bending portion of the first inner longitudinal groove.

3. The winter tire according to claim 2, wherein the second inner longitudinal groove is located between the second tread edge and the tire equator, the second inner longitudinal groove comprises a bending portion protruding toward the tire equator, and one of the first inner end portions is connected to the bending portion of the second inner longitudinal groove.

4. The winter tire according to claim 1, wherein the first inner end portions are arranged on a different location with respect to the second inner end portions in the axial direction of the tire.

5. The winter tire according to claim 1, wherein the tread portion is further provided with a first inner lateral groove that extends axially outward from the first inner longitudinal groove with an opposite inclination direction to the first inclined main grooves.

6. The winter tire according to claim 1, wherein the tread portion is further provided with a second inner lateral groove that extends axially outwardly from the second inner longitudinal groove with an opposite inclination direction to the second inclined main grooves.

7. The winter tire according to claim 1, wherein the axially second inner end portion extends in parallel with the axial direction of the tire.

8. The winter tire according to claim 1, wherein the axial width of the first inner end portion is in a range of from 3% to 8% of a tread width.

9. The winter tire according to claim 1, wherein the axial width of the second inner end portion is in a range of from 3% to 8% of a tread width.

* * * * *